United States Patent
Wu et al.

(10) Patent No.: US 11,641,650 B2
(45) Date of Patent: May 2, 2023

(54) TIMING ADVANCE (TA) DETERMINATION FOR SIDELINK (SL) COMMUNICATION

(71) Applicant: QUALCOMM Incorporated, San Diego, CA (US)

(72) Inventors: Shuanshuan Wu, San Diego, CA (US); Kapil Gulati, Belle Mead, NJ (US); Hua Wang, Basking Ridge, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/117,746

(22) Filed: Dec. 10, 2020

(65) Prior Publication Data
US 2022/0191856 A1 Jun. 16, 2022

(51) Int. Cl.
| | |
|---|---|
| H04W 4/00 | (2018.01) |
| H04W 72/04 | (2023.01) |
| H04J 3/06 | (2006.01) |
| H04L 5/14 | (2006.01) |
| H04W 72/0446 | (2023.01) |
| H04W 92/18 | (2009.01) |

(52) U.S. Cl.
CPC .......... *H04W 72/0413* (2013.01); *H04J 3/06* (2013.01); *H04L 5/14* (2013.01); *H04W 72/0446* (2013.01); *H04W 92/18* (2013.01)

(58) Field of Classification Search
CPC .......... H04J 3/06; H04L 7/0083; H04L 7/041; H04L 7/06
See application file for complete search history.

(56) References Cited

U.S. PATENT DOCUMENTS

| | | |
|---|---|---|
| 2016/0302246 A1 | 10/2016 | Chervyakov et al. |
| 2018/0167904 A1 | 6/2018 | Lee et al. |
| 2018/0278380 A1* | 9/2018 | Kim ............... H04L 1/1854 |
| 2018/0324848 A1 | 11/2018 | Baghel et al. |
| 2019/0150141 A1* | 5/2019 | Irukulapati ....... H04W 72/0446 370/280 |
| 2020/0178192 A1 | 6/2020 | Chae et al. |
| 2020/0220669 A1 | 7/2020 | Park |
| 2020/0260231 A1* | 8/2020 | Ganesan ........... H04L 1/1893 |
| 2020/0267692 A1 | 8/2020 | Wu et al. |
| 2020/0350949 A1* | 11/2020 | Rico Alvarino ....... H04L 1/189 |
| 2020/0351855 A1 | 11/2020 | Kung et al. |

(Continued)

FOREIGN PATENT DOCUMENTS

WO  2020200017 A1  10/2020

OTHER PUBLICATIONS

International Search Report and Written Opinion—PCT/US2021/061996—ISA/EPO—dated Mar. 7, 2022.

(Continued)

*Primary Examiner* — Bo Hui A Zhu
(74) *Attorney, Agent, or Firm* — Patterson + Sheridan, LLP

(57) ABSTRACT

Aspects of the present disclosure provide apparatus, methods, processing systems, and computer readable mediums for determining timing advances (TAs) for use in sidelink (SL) communications. A method that may be performed by a transceiver (TX) user equipment (UE) includes applying a first TA when transmitting at least a first SL transmission to a receiver (RX) UE and applying a second TA when transmitting at least a second SL transmission to the RX UE.

24 Claims, 12 Drawing Sheets

(56) References Cited

U.S. PATENT DOCUMENTS

2021/0168817 A1* 6/2021 Zhao .................... H04W 72/08
2022/0132445 A1* 4/2022 Kim ................. H04W 56/0045

OTHER PUBLICATIONS

LG Electronics: "Discussion on draft CR of RRM Core Requirement for V2V", 3GPP Draft, 3GPP TSG-RAN WG4 Meeting #79, R4-163695, 3rd Generation Partnership Project (3GPP), Mobile Competence Centre, 650, Route Des Lucioles, F-06921 Sophia-Antipolis Cedex, France, vol. RAN WG4, No. Nanjing, China, May 23, 2016-May 27, 2016, May 22, 2016 (May 22, 2016), XP051106660, 12 Pages, Retrieved from the Internet: URL: http://www.3gpp.org/ftp/Meetings_3GPP_SYNC/RAN4/Docs/ [Retrieved on May 22, 2016] Section 7.16.2.

* cited by examiner

TIMING ADVANCE (TA) DETERMINATION FOR SIDELINK (SL) COMMUNICATION

BACKGROUND

Field of the Disclosure

Aspects of the present disclosure relate to wireless communications, and more particularly, to timing adjustments for processing sidelink (SL) communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

Sidelink (SL) communications generally refer to communications between devices (e.g., between UEs). As the demand for mobile broadband access continues to increase, the demand for improvements to SL communications increases, as well.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved device-to-device communications in a wireless network.

Certain aspects of this disclosure provide a method for wireless communications by a transmitter (TX) user equipment (UE). The method generally includes applying a first timing advance (TA) when transmitting at least a first sidelink (SL) transmission to a receiver (RX) UE. The method generally includes applying a second TA when transmitting at least a second SL transmission to the RX UE.

Certain aspects of this disclosure provide a method for wireless communications by a RX UE. The method generally includes obtaining, from a TX UE, an indication, in a first SL transmission, of a TA. The method generally includes applying the TA when receiving at least a second SL transmission from the TX UE.

Certain aspects of this disclosure provide a TX UE. The TX UE generally includes at least one antenna and a processing system configured to apply a first TA when transmitting, via the at least one antenna, at least a first SL transmission to a RX UE and apply a second TA when transmitting, via the at least one antenna, at least a second SL transmission to the RX UE.

Certain aspects of this disclosure provide a RX UE. The RX UE generally includes a receiver configured to receive, from a TX UE, an indication, in a first SL transmission, of a TA and a processing system configured to apply the TA when receiving at least a second SL transmission from the TX UE.

Certain aspects of this disclosure provide a TX UE. The TX UE generally includes means for providing at least one antenna, means for applying a first TA when transmitting, via the at least one antenna, at least a first SL transmission to a RX UE and means for applying a second TA when transmitting, via the at least one antenna, at least a second SL transmission to the RX UE.

Certain aspects of this disclosure provide a RX UE. The RX UE generally includes means for receiving, from a TX UE, an indication, in a first SL transmission, of a TA and means for applying the TA when receiving at least a second SL transmission from the TX UE.

Certain aspects of this disclosure provide a computer-readable medium for wireless communications by a TX UE. The computer-readable medium generally includes codes executable to apply a first TA when transmitting at least a first SL transmission to a RX UE and apply a second TA when transmitting at least a second SL transmission to the RX UE.

Certain aspects of this disclosure provide a computer-readable medium for wireless communications by a RX UE. The computer-readable medium generally includes codes executable to obtain, from a TX UE, an indication, in a first SL transmission, of a TA and apply the TA when receiving at least a second SL transmission from the TX UE.

Aspects of the present disclosure also provide various UEs, network entities, apparatuses, means, and computer-readable mediums corresponding to the methods and operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
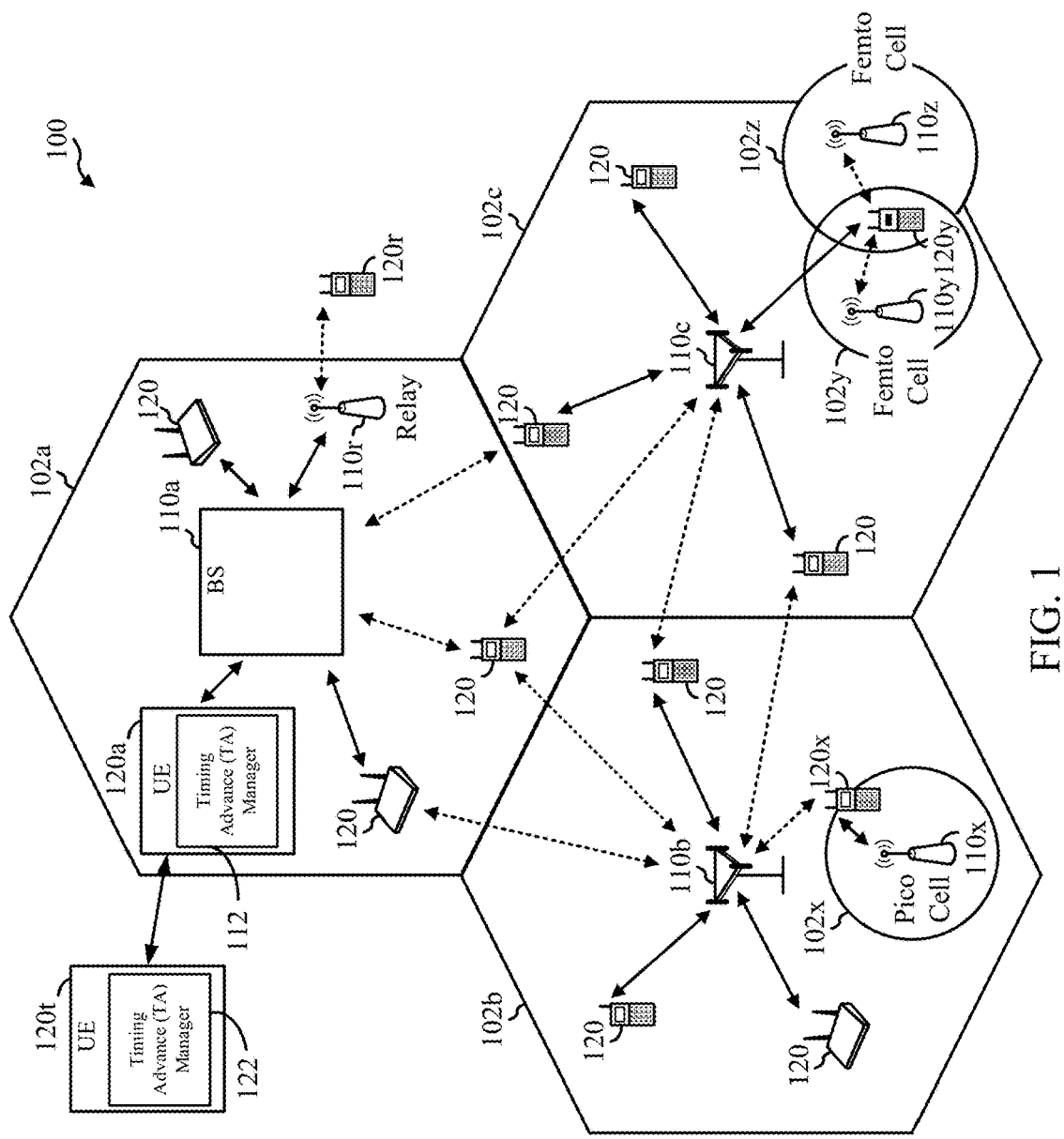
FIG. 1 is a block diagram conceptually illustrating an example telecommunications system, in accordance with certain aspects of the present disclosure.
Figure 1:
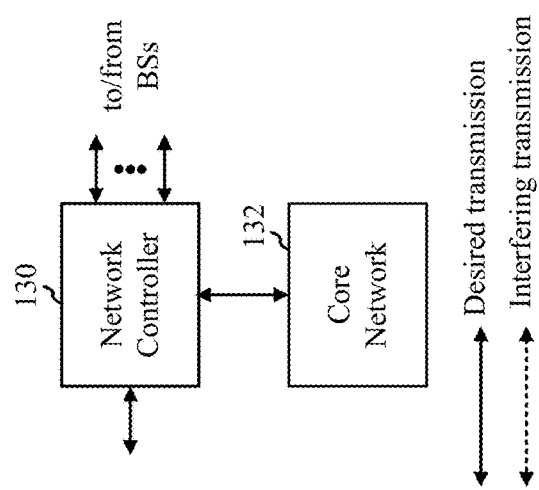

Aspects of the present disclosure provide apparatus, methods, processing systems, and computer readable mediums for determining timing advances (TAs) for use in sidelink (SL) communications. For example, in some cases, a transmitter (TX) user equipment (UE) may determine at least one of a first TA or a second TA to be applied when transmitting, at least a first SL transmission and at least a second SL transmission, respectively, to a receiver (RX) UE.

The following description provides examples of TA determinations for SL communication, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network may include BSs 110 and UEs 120 configured for determining timing advances (TAs) for use in sidelink (SL) communications. In some examples, the UEs 120 may be configured for SL communications. As shown in FIG. 1, one or more UEs 120 (e.g., transmitter (TX) UE) of the wireless communication network 100 may be configured to perform (or have a timing advance (TA) manager 112 configured to perform or cause the UE to perform) operations 600 described below with reference to FIG. 6. Additionally, one or more UEs 120 (e.g., receiver (RX) UE) of the wireless communication network 100 may be configured to perform (or have a TA manager 122 configured to perform or cause the UE to perform) operations 700 described below with reference to FIG. 7.

For example, as shown in FIG. 1, one or more of the UEs 120, may have a TA manager 112 that may be configured for applying a first TA when transmitting at least a first sidelink (SL) transmission to a RX UE and applying a second TA when transmitting at least a second SL transmission to the RX UE, according to aspects described herein. Similarly, one or more of the UEs 120, may have a TA manager 122 that may be configured for obtaining, from a TX UE, an indication, in a first SL transmission, of a TA and applying the TA when receiving at least a second SL transmission from the TX UE, according to aspects described herein.

The wireless communication network 100 may be an NR system (e.g., a 5G NR network). As shown in FIG. 1, the wireless communication network 100 may be in communication with a core network 132. The core network 132 may in communication with one or more base station (BSs) and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. In aspects of the present disclosure, a roadside service unit (RSU) may be considered a type of BS, and a BS 110 may be referred to as an RSU. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and send a transmission of the data and/or other information to a downstream station (e.g., a UE 120 or a BS 110), or that relays transmissions between UEs 120, to facilitate communication between devices.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
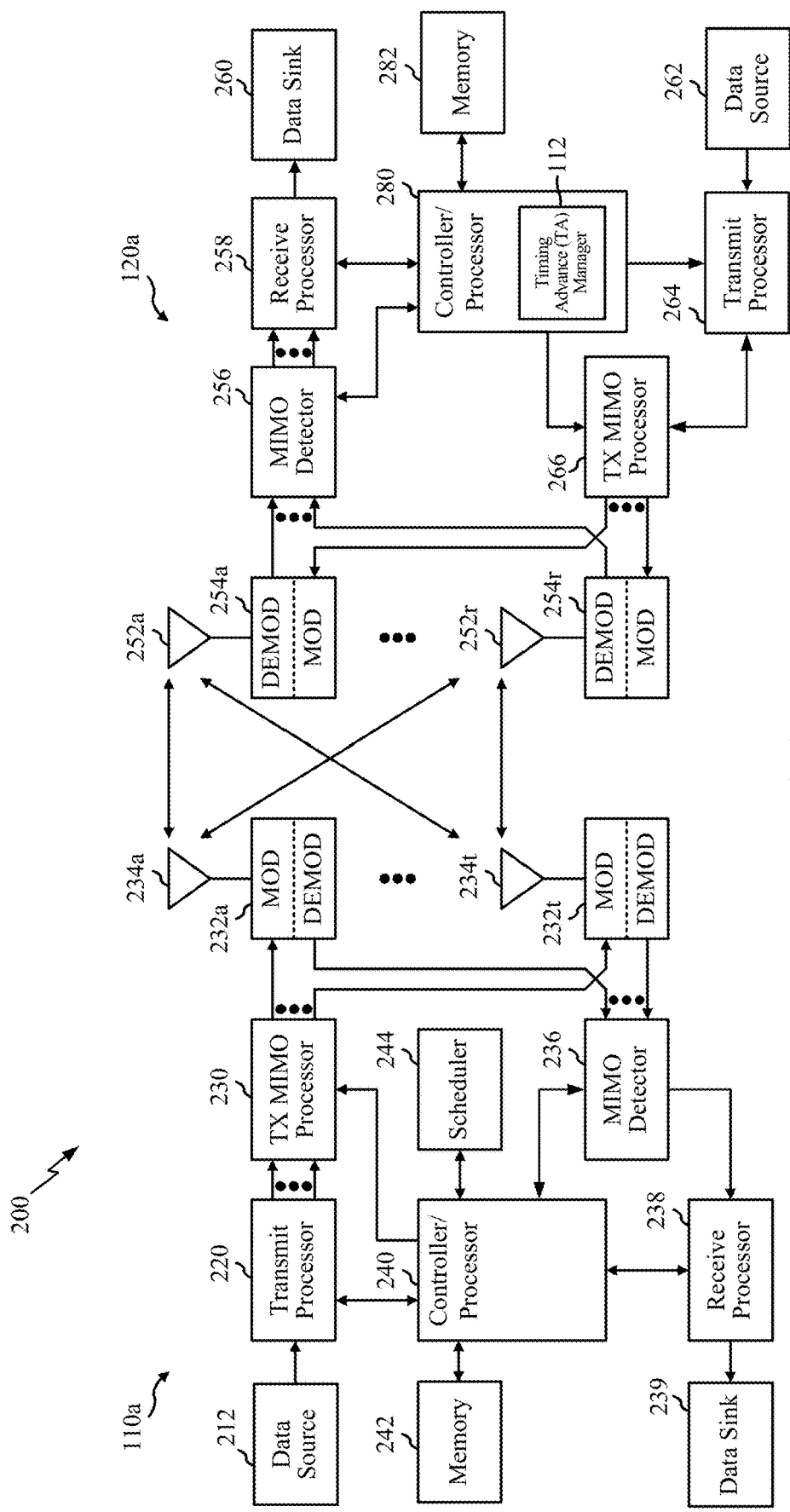
FIG. 2 is a block diagram conceptually illustrating a design of an example base station (BS) and user equipment (UE), in accordance with certain aspects of the present disclosure.

FIG. 2 illustrates example components of BS 110a and UE 120a (as depicted in FIG. 1), which may be used to implement aspects of the present disclosure. For example, antennas 252, processors 266, 258, 264, and/or controller/processor 280 of the UE 120a may be used to perform the various techniques and methods described herein with reference to FIGS. 6 and 7. Similarly, antennas 232, processors 220, 230, 238, and/or controller/processor 240 of the BS 110a may be used to perform the various techniques and methods described herein.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120a, the antennas 252a through 252r may receive the downlink signals from the BS 110a and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a through 254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

NR may utilize orthogonal frequency division multiplexing (OFDM) with a cyclic prefix (CP) on the uplink and/or downlink and/or single-carrier frequency division multiplexing (SC-FDM) on the uplink. NR may support half-duplex operation using time division duplexing (TDD).

OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The NR resource block (RB) may be 12 consecutive frequency subcarriers. NR may support a base subcarrier spacing (SCS) of 15 KHz and other SCS may be defined with respect to the base SCS (e.g., 30 kHz, 60 kHz, 120 kHz, 240 kHz, etc.). The system bandwidth may also be partitioned into subbands. For example, a subband may cover multiple RBs.

Figure 3:
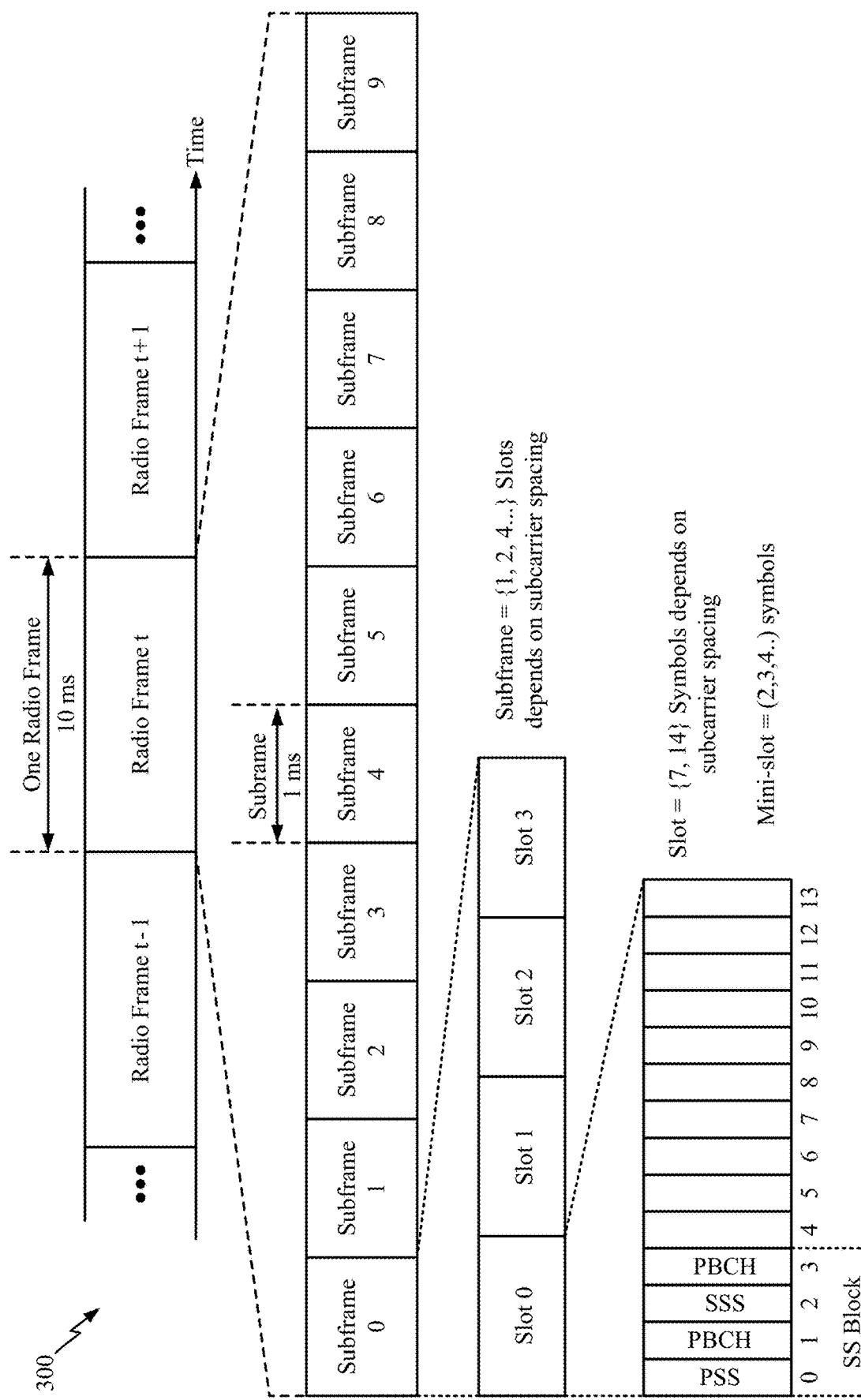
FIG. 3 illustrates an example of a frame format for a new radio (NR) system, in accordance with certain aspects of the present disclosure

In NR, a subframe is 1 ms, but the basic TTI is referred to as a slot. FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In some circumstances, two or more subordinate entities (e.g., UEs) may communicate with each other using SL signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a SL signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the SL signals may be communicated using a licensed spectrum (unlike wireless local area networks (WLANs), which typically use an unlicensed spectrum).

Various SL channels may be used for SL communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as SL resource configurations and other parameters used for data transmissions, and the PSSCH may carry the data transmissions.

For the operation regarding PSSCH, a UE performs either transmission or reception in a slot on a carrier. A reservation or allocation of transmission resources for a sidelink transmission is typically made on a sub-channel of a frequency band for a period of a slot. NR sidelink supports for a UE a case where all the symbols in a slot are available for sidelink, as well as another case where only a subset of consecutive symbols in a slot is available for sidelink.

Figure 4A:
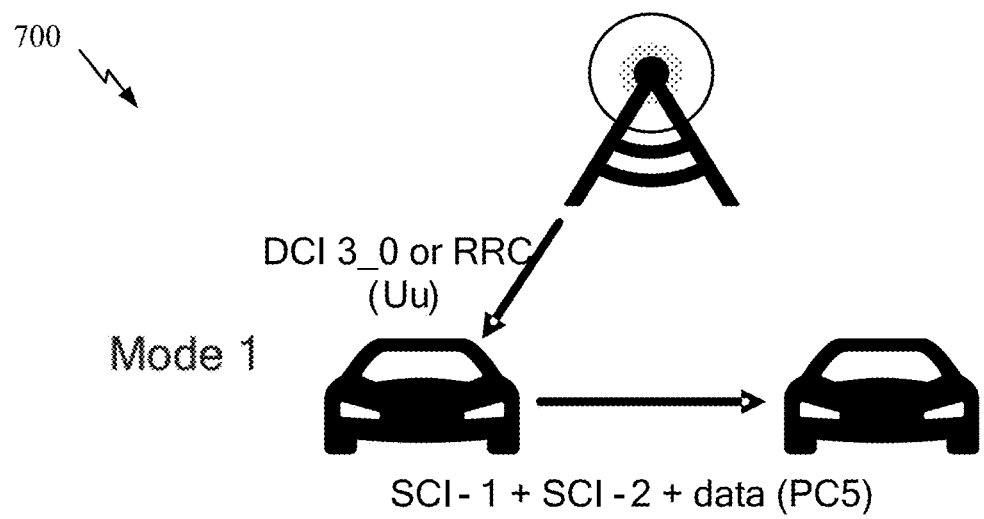
FIGS. 4A and 4B illustrate two modes of sidelink (SL) communication, in accordance with certain aspects of the present disclosure.
Figure 4B:
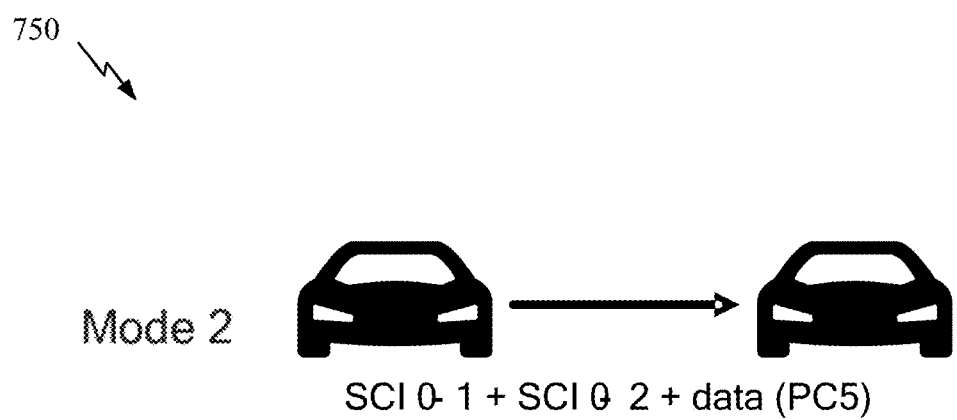

In NR, there are generally two basic SL resource allocation modes. FIGS. 4A and 4B illustrate two modes of SL communication, in accordance with certain aspects of the present disclosure. According to a first mode (Mode 1), as shown in FIG. 4A, a BS may allocate resources for SL communications between UEs. According to a second mode (Mode 2), UEs autonomously select SL resources (following some rules in NR standard).

Signaling on the SL, however, is the same for both resource allocation modes. Thus, from the receiver UE point of view, there is no difference between the two modes. A resource pool can be shared by Mode 1 and Mode 2 resource allocations.

In certain systems, TAs may be used to control uplink (UL) signal timing in cellular UL transmissions. Based on a TA, a UE may delay (e.g., send late) an UL transmission or advance the UL transmission (e.g., send early) by some amount with respect to a reference timing.

For example, during a random access channel (RACH) procedure, a network entity (e.g., a BS) may determine a TA to be applied in UL transmissions by measuring propagation delay from a RACH signal. In LTE, when a UE wishes to establish a radio resource control (RRC) connection with at network entity, the UE may transmit a Random Access Preamble. Following receipt of the preamble, the network entity may estimate the transmission timing of the terminal and transmit a Random Access Response which may consist of a TA command. Based on the TA, the UE may adjust the terminal transmit timing with respect to downlink timing.

Figure 5:
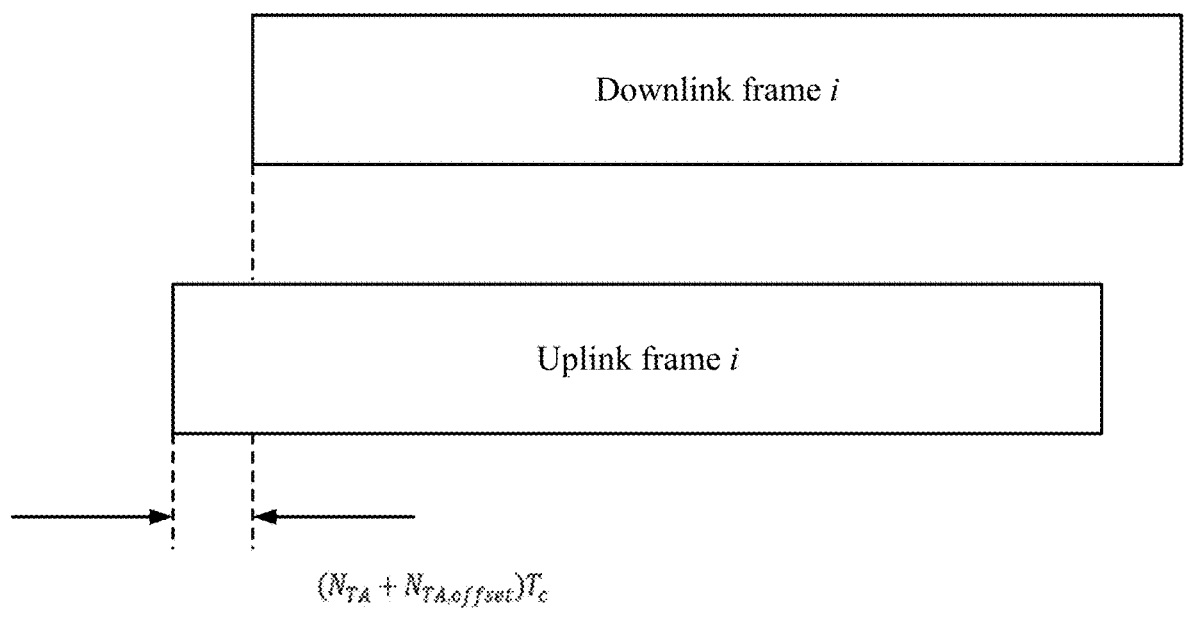
FIG. 5 illustrates an example relationship between Long Term Evolution (LTE) downlink (DL) timing and uplink (UL) timing during a random access channel (RACH) procedure, in accordance with certain aspects of the present disclosure.

FIG. 5 illustrates an example relationship between LTE downlink (DL) timing and UL timing during a RACH procedure, in accordance with certain aspects of the present disclosure. As shown in FIG. 5, a network entity (e.g., BS) may transmit a DL frame i at time $t_0$ which may be received by a UE at time $t_0+t_{pd}$, where $t_{pd}$ is the propagation delay from the network entity to the UE. Subsequently, the UE may transmit a RACH signal (e.g., UL frame i as shown in FIG. 5) with timing reference $t_0+t_{pd}$ which may be received by the network entity at time $t_0+2t_{pd}$. The network entity may determine the TA based on the propagation delay determined from the timing of received RACH signal.

Generally, the TA determined by the network entity is approximately $2t_{pd}$ with respect to the UE's DL receive time. When the UE applies this TA for UL transmission (i.e., UE advance UL transmission by $2t_{pd}$ with respect to its DL timing), the UE ensures that the UL signal arriving time at the network entity aligns with the network entity DL transmitter (TX) timing.

Because TAs depend on the propagation delay from the network entity, various UEs may apply different TAs to their UL transmissions. This helps to ensure that UL signal arrival timings from different UEs are aligned with the network entity DL TX timing.

Example Timing Advance (TA) Determination for Sidelink (SL) Communication

Aspects of the present disclosure provide apparatus, methods, processing systems, and computer readable mediums for determining timing advances (TAs) for use in sidelink (SL) communications. For example, in some cases, a transmitter (TX) user equipment (UE) may determine at least one of a first TA or a second TA to be applied when transmitting at least a first SL transmission and at least a second SL transmission, respectively, to a receiver (RX) UE.

In SL communication (e.g., vehicle-to-everything (V2X) or device-to-device (D2D)), two or more UEs may share the uplink (UL) spectrum. For example, a pool of resources in the UL spectrum (e.g., resource elements in UL slots) may be configured for SL communication between two or more UEs.

As mentioned above (in reference to FIGS. 4A and 4B), there are generally two basic SL resource allocation modes (e.g., Mode 1 and Mode 2). In Mode 1, where SL communication, sharing the UL spectrum, is scheduled by the BS, the BS may allocate resource(s) to a SL TX UE (e.g., via downlink control information (DCI)). The SL TX UE may transmit, in the in the allocated resources, sidelink control information (SCI) and data to a SL RX UE. The SL RX UE may detect the SCI and decode the data. In Mode 2, where UEs autonomously select SL resources, a BS may indicate the resource pool configuration allowing for a SL TX UE to select resource(s). Accordingly, the SL TX UE may select resource(s) from the pool and transmit, in the selected resources, SCI and data to a SL RX UE. The SL RX UE may detect the SCI and decode the data.

In some cases, TA(s) may be applied in SL transmission (s). For example, in LTE Release 12 and 13 SL Mode 1, timing of an SCI transmission may be based on downlink (DL) timing while timing of a data channel transmission may be based on DL timing plus a UL TA (wherein the UL TA is based on UL timing). The TA may be indicated in SCI, and either the SL TX UE or SL RX UE may apply the UL TA for transmitting and receiving, respectively. In LTE Release 12 and 13 SL Mode 2, as another example, a TA may not be applied. In LTE Release 14 and 15, as another example, all transmission modes may be based on DL timing (or GNSS timing in V2X communication) and a TA may not be applied. Additionally, in NR Release 16, all SL transmission modes may be based on DL timing and no TA may be applied.

Applying DL timing and/or UL timing in SL transmissions, however, may lead to further issues. In cases where DL timing is applied for SL transmissions, UL transmission interference may occur. For example, when SL transmissions and UL transmissions are multiplexed in the same slot (e.g., frequency division multiplexed (FDM)), the misaligned RX timing of two transmissions at a network entity (e.g., BS) may cause interference to the UL transmissions. Alternatively, in cases where UL timing is applied in SL transmission, RX UEs may not be able to correctly decode SL transmissions. For example, when UL timing is applied in the SL transmission, a SL RX UE (and in some cases, such as in autonomous Mode 2, a SL TX UE) may not be aware of the timing used for a SL transmission (e.g., when the timing is based on SL TX UE UL timing). Where the timing used for SL transmission is not DL timing and is unknown to the SL RX UE, the SL RX UE may not be able to correctly decode the SL transmission.

Accordingly, aspects of the present disclosure provide techniques for determining TAs for use in SL communications.

Figure 6:
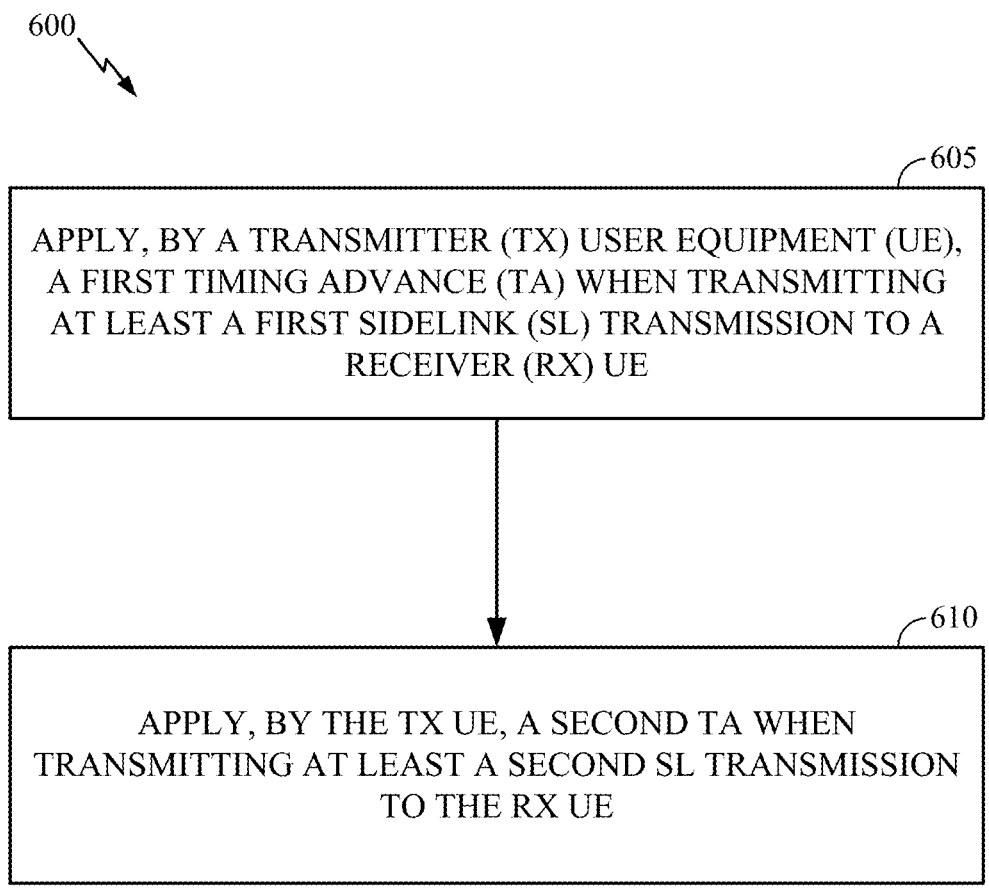
FIG. 6 is a flow diagram illustrating example operations by a transmitter (TX) UE for wireless communication, in accordance with certain aspects of the present disclosure.

FIG. 6 illustrates example operations 600 for wireless communication by a TX UE, in accordance with certain aspects of the present disclosure. For example, operations 600 may be performed by a UE 120 of FIG. 1 or FIG. 2 when performing SL communications with another UE.

Operations 600 begin, at 605, by the TX UE, applying a first TA when transmitting at least a first SL transmission to a RX UE. At 610, the TX UE applies a second TA when transmitting at least a second SL transmission to the RX UE.

In some aspects, the first SL transmission comprises a PSCCH and the second SL transmission comprises a PSSCH.

In some aspects, the first SL transmission comprises a first transmission of a first TB and the second SL transmission comprises at least one of a retransmission of the first TB or a transmission of a second TB.

Figure 7:
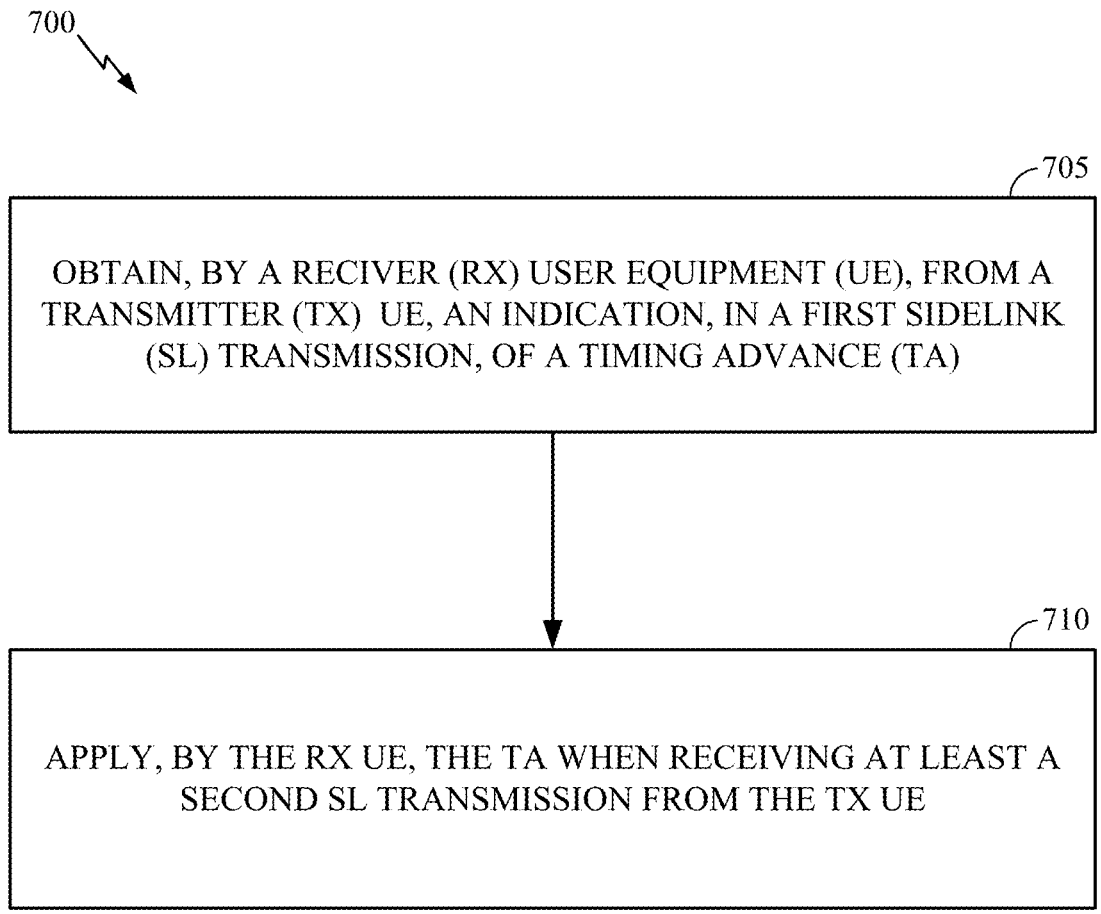
FIG. 7 is a flow diagram illustrating example operations by a receiver (RX) UE for wireless communication, in accordance with certain aspects of the present disclosure.

FIG. 7 illustrates example operations 700 for wireless communication by a RX UE that may be considered complementary to operations 600 of FIG. 6. For example, operations 700 may be performed by a RX UE to receive an indication of a second TA from a TX UE performing operations 600 of FIG. 6.

Operations 700 begin, at 705, by a RX UE obtaining, from a TX UE, an indication, in a first SL transmission, of a TA. At 710, the RX UE applies the TA when receiving at least a second SL transmission from the TX UE In aspects of the present disclosure, a TX UE may determine at least one of a first TA or a second TA to be applied for SL transmissions. The TX UE may apply the first TA when transmitting at least a first SL transmission to a RX UE. The TX UE may apply the second TA when transmitting at least a second SL transmission to the RX UE.

In some aspects, the first SL transmission may be a control signaling transmission (e.g., physical sidelink control channel (PSCCH)), and the second SL transmission may be a data channel transmission (e.g., a physical sidelink shared channel (PSSCH)). Long Term Evolution (LTE) Release 12 D2D includes similarly defined SL transmissions; however, examples herein may include different design options.

In some aspects, the first SL transmission may be the first transmission of a transport block (TB) (e.g., new transmission of a first TB), and the second SL transmission may be a retransmission of the same TB (e.g., retransmission of the first TB).

In some aspects, the first SL transmission may be a transmission of a first transport block (TB) (e.g., new transmission or retransmission of the first TB), and the second SL transmission may be a first transmission of another TB (e.g., new transmission of a second TB).

In some aspects, the first TA may be based on a pre-determined value. If SL communications between the TX UE and the RX UE share a frequency division duplex (FDD) spectrum (e.g., FDD UL band), the pre-determined value may be zero. If SL communications between the TX UE and the RX UE share a time division duplex (TDD) spectrum (e.g., TDD UL slots), the pre-determined value may be a fixed value (e.g., fixed value $t_{TA,offset}$ specified in the 3GPP specification).

In some aspects, the second TA may be based on an UL TA of the TX UE. In some examples, the second TA may be based on a quantized UL TA of the TX UE. In some examples, the second TA may be based on a mapping of the UL TA.

In some aspects, the second TA may be based on an indication received from a network entity (e.g., BS). The TX UE may receive an indication of the second TA via a downlink control information (DCI). The network entity may indicate to apply a TA of zero or a non-zero value. The non-zero TA may be a pre-determined value (e.g., fixed) or a TA based on an UL TA of the TX UE.

In aspects of the present disclosure, when the first SL transmission comprises a PSCCH and the second SL transmission comprises a PSSCH, the first and second SL transmissions may be transmitted via time division multiplexing (TDM) in a same time slot. For example, the first SL transmission may be transmitted in a first set of orthogonal frequency-division multiplex (OFDM) symbols of a slot. The second transmission may be transmitted in the second set of OFDM symbols of the same slot. Furthermore, a gap may exist between the first SL transmission and the second SL transmission.

Figure 8A:
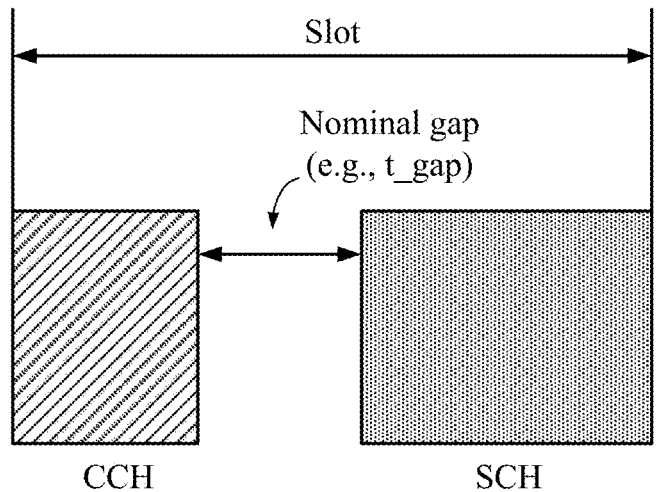
FIGS. 8A and 8B illustrate a nominal slot format for SL data transmission (with no TA applied) and an actual slot format for SL data transmission (with a TA applied), respectively, in accordance with certain aspects of the present disclosure.
Figure 8B:
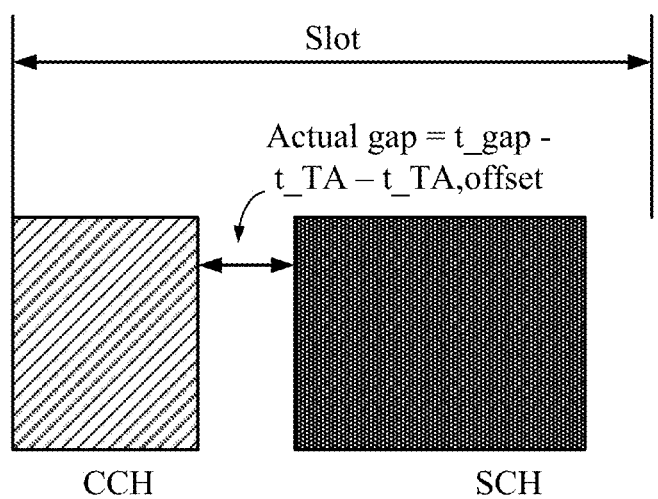

FIGS. 8A and 8B illustrate a nominal slot format for SL data transmission (with no TA applied) and an actual slot format for SL data transmission (with a TA applied), respectively, in accordance with certain aspects of the present disclosure. A control channel (CCH) transmission and a shared channel (SCH) (e.g., data channel) transmission may be TDM'ed in the same slot. As shown in FIG. 8A, a nominal gap duration (e.g., $t_{gap}$) may exist between the CCH and SCH transmissions when the TX UE does not apply a TA when transmitting the SCH transmission to a RX UE. In some examples, the nominal gap duration may be specified, pre-configured or configured by a network entity. In some examples, the pre-configured nominal gap duration may be based, at least in part, on a set of pre-determined gap durations.

Alternatively, as shown in FIG. 8B, when the TX UE applies a non-zero TA when transmitting the SCH transmission to a RX UE, a smaller gap (in comparison to the nominal gap, $t_{gap}$) between the CCH and SCH may exist. When a non-zero TA is applied, the data transmission is transmitted earlier, thus resulting in a smaller gap duration between the CCH and the SCH than when no TA is applied to the SCH transmission. The actual observed gap when a TA is applied to the SCH transmission may be equal to $t_{gap} - t_{TA} - t_{TA,offset}$. Accordingly, as the applied TA increases in value, the duration of the gap actually observed decreases.

Figure 9:
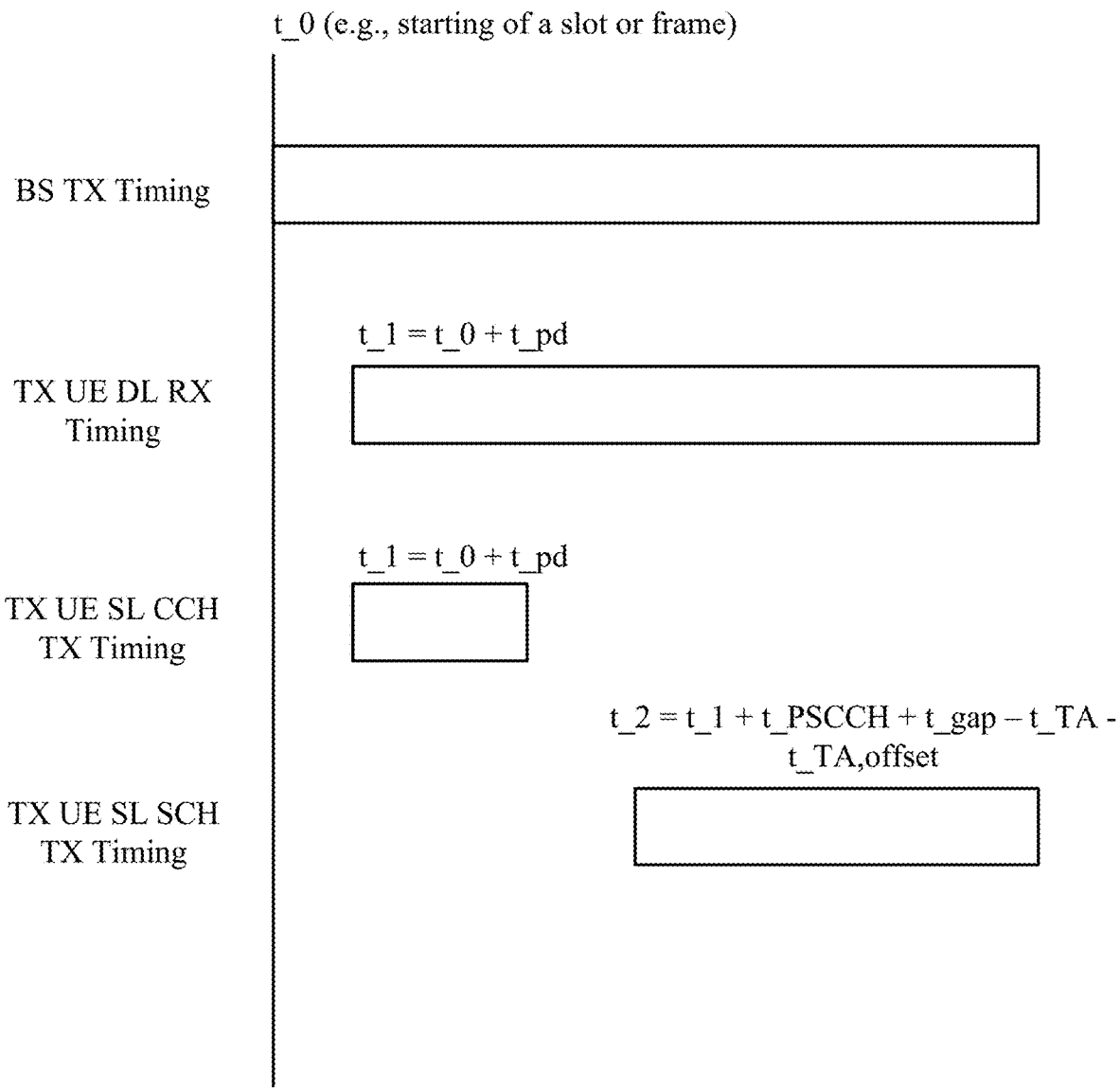
FIG. 9 is an exemplary transmission timeline illustrating application of TAs in SL communication, in accordance with certain aspects of the present disclosure.

FIG. 9 is an exemplary transmission timeline illustrating application of TAs in SL communication, in accordance with certain aspects of the present disclosure. As shown in FIG. 9, at the start of a slot or frame (e.g., $t_0$), a network entity (e.g., BS) may transmit a DL frame i at time $t_0$ which may be observed by a TX UE at time $t_0 + t_{pd}$, where $t_{pd}$ is the propagation delay from the network entity to the TX UE. Subsequently, the TX UE may transmit sidelink control information (SCI) in a sidelink control channel (e.g., PSCCH) to a RX UE. Transmission of the SCI, at $t_1$, may be based, at least in part, on the observed DL timing ($t_1 = t_0 + t_{pd,TX}$). The SL control channel may have a duration of $t_{PSCCH}$. A gap with a pre-determined nominal duration may follow transmission of the control channel transmission (e.g., $t_{gap}$). To reduce the gap duration between the CCH transmission and the SCH transmission, the TX UE may determine a TA (e.g., $t_{TA}$) for the second SL transmission (e.g., the SCH transmission in this example). Accordingly, the TX UE may transmit the data channel (e.g., SCH) at time $t_2 = t_1 + t_{PSCCH} + t_{gap} - t_{TA} - t_{TA,offset}$, where $t_{PSCCH}$ is the duration of the SL CCH transmission, $t_{gap}$ is the nominal gap duration, $t_{TA}$ is the second TA applied to the second SL transmission, and $t_{TA,offset}$ is the first TA applied (if any) to the first SL transmission.

The nominal gap duration, $t_{gap}$, may be equal to or greater than $t_{TA} + t_{TA,offset}$ such that the actual gap between the CCH and SCH transmission is greater than zero (e. g., $t_{gap} - (t_{TA} + t_{TA,offset}) \geq 0$). As mentioned above, the nominal gap duration (e.g., $t_{gap}$) may be specified, pre-configured or configured by the network entity (e.g., the network entity may configure a value based on cell radius).

In some aspects, the first SL transmission may include a first (e.g., initial) transmission of a first TB and the second SL transmission may include either a retransmission of the first TB or a first transmission of a second TB. Accordingly, the TX UE may reserve a future resource for transmission of the second SL transmission such that the second SL transmission may be transmitted in the reserved future resource with a second TA being applied.

Figure 10:
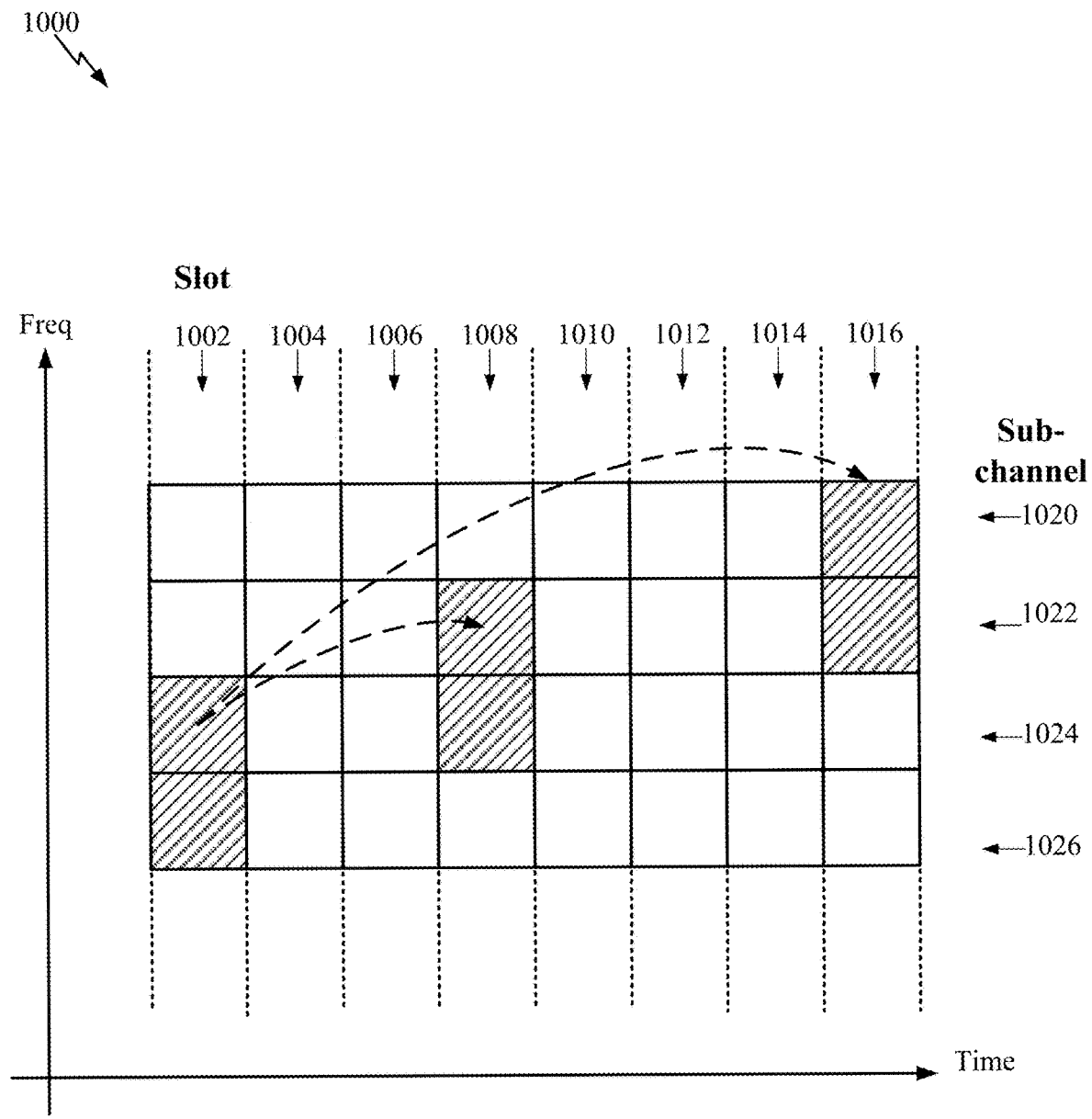
FIG. 10 is an exemplary transmission timeline illustrating transmissions and resource reservations by a SL device, in accordance with aspects of the present disclosure.

FIG. 10 is an exemplary transmission timeline illustrating transmissions and resource reservations by a SL device, in accordance with aspects of the present disclosure. As shown in the exemplary transmission timeline of FIG. 10, a UE (e.g., UE 120a, shown in FIG. 1) that is a SL device may transmit a SL transmission during a slot 1002 on the subchannels 1024 and 1026. The control information that the UE includes in the SL transmission may reserve transmission resources on subchannels 1022 and 1024 during slot 1008. The control information in the SL transmission may also reserve transmission resources on subchannels 1020 and 1022 during slot 1016. The transmission resources may be reserved for retransmissions of the data in the SL transmission or transmission of another TB.

As described with reference to FIG. 9, the TX UE may transmit the first SL transmission based on DL timing (e.g., DL timing observed by the TX UE). In other words, the first TA, for the first SL transmission, may be based on DL timing for a transmission between a network entity and the TX UE. In some examples, the first TA may be zero (e.g., no TA applied). In some examples, the first TA may be equal to $t_{TA,offset}$.

Subsequently, when the TX UE transmits a second SL transmission in the reserved resource, the TX UE may apply a second TA. For example, the TX UE may transmit in the reserved resource with a TA=$t_{TA} + t_{TA,offset}$ applied, where $t_{TA}$ is the second TA applied to the second SL transmission and $t_{TA,offset}$ is the first TA applied (if any) to the first SL transmission. In some examples, the second TA, $t_{TA}$, may be based on UL timing for a transmission between a network entity and the TX UE. In some examples, the first TA, $t_{TA,offset}$, may be based on a pre-determined value (e.g., zero or a fixed value).

In some aspects, the TX UE may indicate, in the first SL transmission to the RX UE, the TA value to be applied when receiving at least a second SL transmission (e.g., the second TA or $t_{TA}$). The indicated TA may allow the RX UE, receiving the first SL transmission, to determine a correct receiving timing for at least a second SL transmission from the TX UE. In some examples, the first SL transmission indicating the second TA may be SCI (e.g., $2^{nd}$ stage SCI).

In some aspects, resource reservation may be chained. Chained resource reservation may include, in a n-th transmission, reserving resources for an (n+1)-th transmission. In accordance with certain aspects of the present disclosure, in each transmission, up to n transmission, a TA may be indicated to the RX UE. The RX UE may apply the TA indicated in the current SL transmission to the next SL transmission from the TX UE to the RX UE.

In some aspects, the RX UE may miss the first SL transmission from the TX UE. Accordingly, the RX UE may recover receiving the second SL transmission based on implementation.

Figure 11:
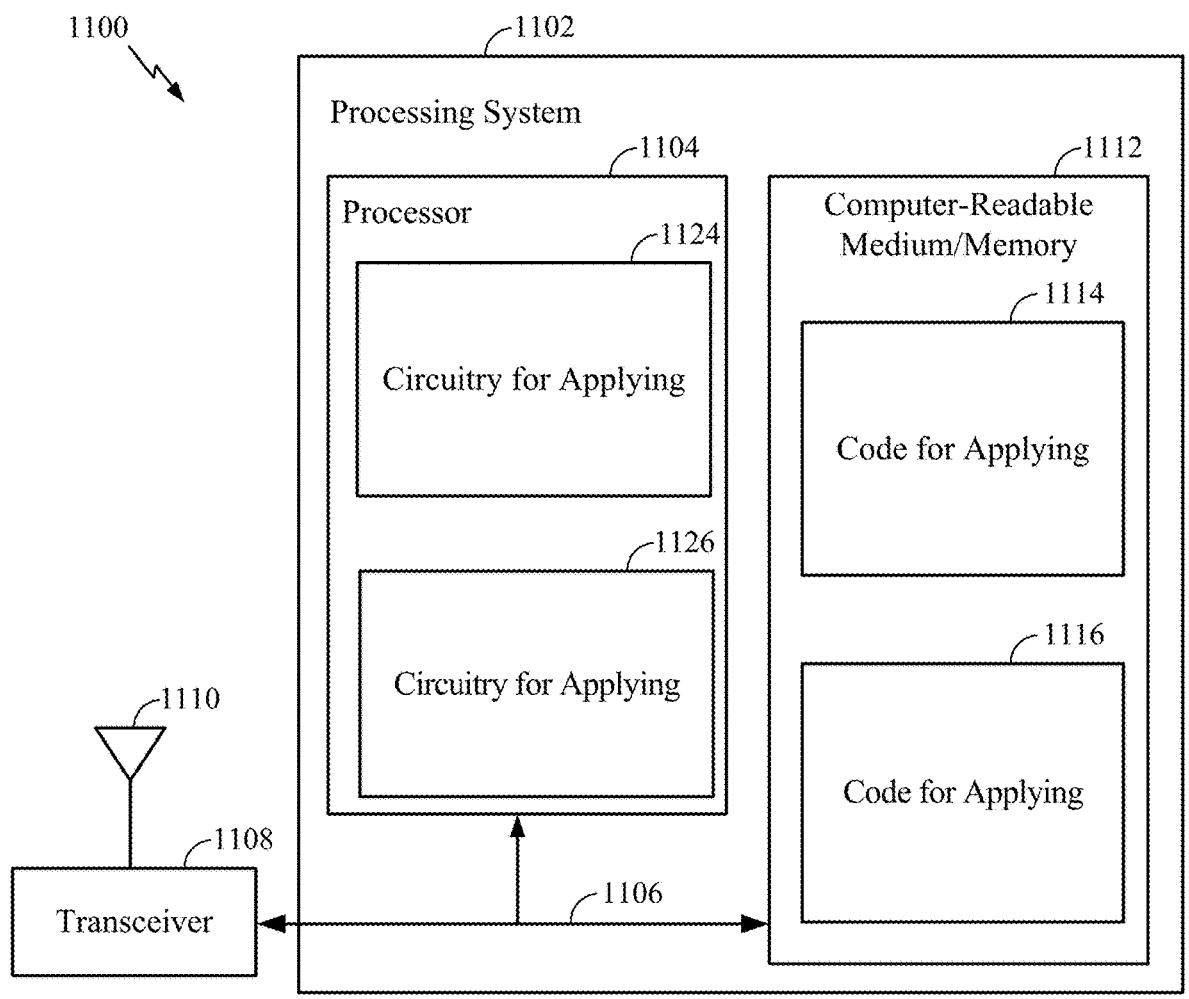
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 6. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 6, or other operations for performing the various techniques discussed herein. In certain aspects, computer-readable medium/memory 1112 stores code 1114 for applying (e.g., for applying a first TA when transmitting at least a first SL transmission to a RX UE) and code 1116 for applying (e.g., for applying a second TA when transmitting at least a second SL transmission to the RX UE). In certain aspects, the processor 1004 has circuitry configured to implement the code stored in the computer-readable medium/memory 1112. The processor 1104 includes circuitry 1124 for applying (e.g., for applying a first TA when transmitting at least a first SL transmission to a RX UE) and circuitry 1126 for applying (e.g., for applying a second TA when transmitting at least a second SL transmission to the RX UE).

Figure 12:
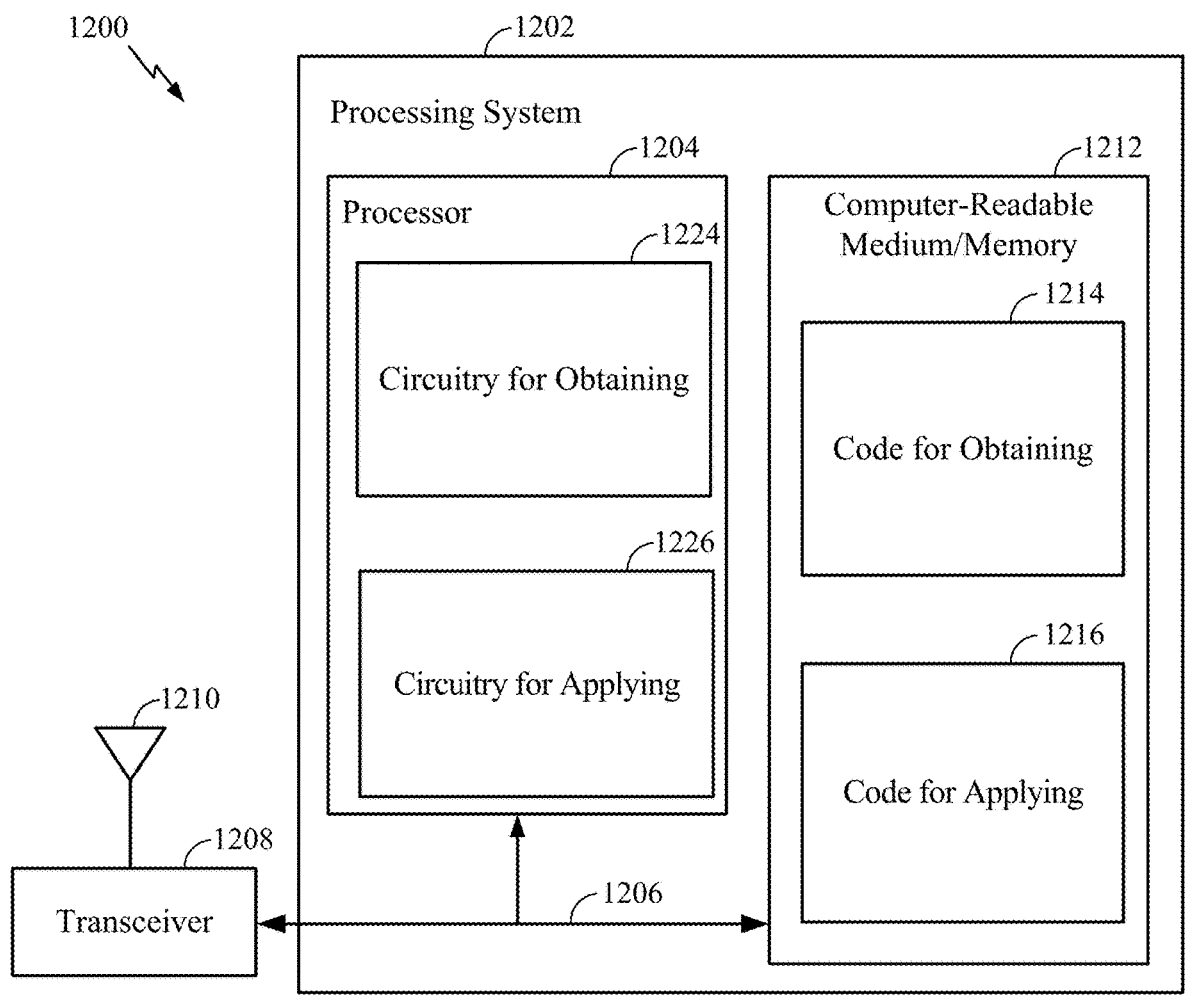
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 7. The communications device 1200 includes a processing system 1202 coupled to a transceiver 1208. The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 7, or other operations for performing the various techniques discussed herein. In certain aspects, computer-readable medium/memory 1212 stores code 1214 for obtaining (e.g., for obtaining, from a TX UE, an indication, in a first SL transmission, of a TA) and code 1216 for applying (e.g., for applying the TA when receiving at least a second SL transmission from the TX UE). In certain aspects, the processor 1204 has circuitry configured to implement the code stored in the computer-readable medium/memory 1212. The processor 1204 includes circuitry 1224 for obtaining (e.g., for obtaining, from a TX UE, an indication, in a first SL transmission, of a TA) and circuitry 1226 for applying (e.g., for applying the TA when receiving at least a second SL transmission from the TX UE).

Example Aspects

In addition to the various aspects described above, aspects of specific combinations are within the scope of the disclosure, some of which are detailed below:

Aspect 1: A method of wireless communications by a transmitter (TX) user equipment (UE), comprising: applying a first timing advance (TA) when transmitting at least a first sidelink (SL) transmission to a receiver (RX) UE; and applying a second TA when transmitting at least a second SL transmission to the RX UE.

Aspect 2: The method of Aspect 1, wherein: the first SL transmission comprises a physical sidelink control channel (PSCCH); and the second SL transmission comprises a physical sidelink shared channel (PSSCH).

Aspect 3: The method of any one of Aspects 1-2, wherein the first and second SL transmissions are transmitted via time division multiplexing (TDM) in a same time slot.

Aspect 4: The method of any one of Aspects 1-3, wherein the first TA is based on downlink (DL) timing for a transmission between a network entity and the TX UE.

Aspect 5: The method of any one of Aspects 1-4, further comprising determining the second TA based on a nominal gap duration between an end of the first SL transmission and a beginning of the second SL transmission.

Aspect 6: The method of Aspect 5, wherein the nominal gap duration is specified, pre-configured or configured by a network entity.

Aspect 7: The method of Aspect 5, wherein the pre-configured nominal gap duration is based, at least in part, on a set of pre-determined gap durations.

Aspect 8: The method of any one of Aspects 1-7, wherein: the first SL transmission comprises a first transmission of a first transport block (TB); and the second SL transmission comprises at least one of a retransmission of the first TB or a transmission of a second TB.

Aspect 9: The method of Aspect 8, further comprising: reserving a future resource for transmission of the second SL transmission, wherein the second SL transmission is transmitted in the reserved future resource with at least one of the first TA or the second TA being applied.

Aspect 10: The method of any one of Aspects 1-9, wherein the first TA is based on downlink (DL) timing for a transmission between a network entity and the TX UE.

Aspect 11: The method of Aspect 10, wherein the first TA is at least one of: a zero value; or an offset value based on the DL timing.

Aspect 12: The method of any one of Aspects 1-11, wherein the second TA is based on uplink (UL) timing for a transmission between a network entity and the TX UE.

Aspect 13: The method of any one of Aspects 1-12, further comprising: indicating, in the first SL transmission to the RX UE, the second TA.

Aspect 14: The method of Aspect 13, wherein the indication is indicated in sidelink control information (SCI).

Aspect 15: The method of any one of Aspects 1-14, wherein the first TA is based on a pre-determined value.

Aspect 16: The method of Aspect 15, wherein: if SL communications between the TX UE and the RX UE share a frequency division duplex (FDD) spectrum, the pre-determined value is zero; and if SL communications between the TX UE and the RX UE share a time division duplex (TDD) spectrum, the pre-determined value is a fixed value.

Aspect 17: The method of any one of Aspects 1-16, wherein the second TA is based on at least one of: an uplink (UL) TA of the TX UE; or a quantized UL TA of the TX UE.

Aspect 18: The method of Aspect 17, further comprising: receiving an indication of the second TA via a downlink control information (DCI) from a network entity.

Aspect 19: The method of Aspect 18, wherein the indicated second TA is based on at least one of: a zero value; a pre-determined non-zero value; or the UL TA.

Aspect 20: A method of wireless communications by a receiver (RX) user equipment (UE), comprising: obtaining, from a transmitter (TX) UE, an indication, in a first sidelink (SL) transmission, of a timing advance (TA); and applying the TA when receiving at least a second SL transmission from the TX UE.

Aspect 21: The method of Aspect 20, wherein: the first SL transmission comprises a first transmission of a first transport block (TB); and the second SL transmission comprises at least one of a retransmission of the first TB or a transmission of a second TB.

Aspect 22: The method of any one of Aspects 20-21, wherein the first SL transmission comprises sidelink control information (SCI).

Aspect 23: The method of any one of Aspects 20-22, wherein the indicated TA is based on at least one of: a zero value; a pre-determined non-zero value; or the UL TA.

Aspect 24: A transmitter (TX) user equipment (UE), comprising: at least one antenna; and a processing system configured to apply a first timing advance (TA) when transmitting, via the at least one antenna, at least a first sidelink (SL) transmission to a receiver (RX) UE, and apply a second TA when transmitting, via the at least one antenna, at least a second SL transmission to the RX UE.

Aspect 25: A receiver (RX) user equipment (UE), comprising: a receiver configured to receive, from a transmitter (TX) UE, an indication, in a first sidelink (SL) transmission, of a timing advance (TA); and a processing system configured to apply the TA when receiving at least a second SL transmission from the TX UE.

Aspect 26: A transmitter (TX) user equipment (UE), comprising: means for providing at least one antenna; means for applying a first timing advance (TA) when transmitting, via the at least one antenna, at least a first sidelink (SL) transmission to a receiver (RX) UE; and means for applying a second TA when transmitting, via the at least one antenna, at least a second SL transmission to the RX UE.

Aspect 27: A receiver (RX) user equipment (UE), comprising: means for receiving, from a transmitter (TX) UE, an indication, in a first sidelink (SL) transmission, of a timing advance (TA); and means for applying the TA when receiving at least a second SL transmission from the TX UE.

Aspect 28: A computer-readable medium for wireless communications by a transmitter (TX) user equipment (UE), comprising codes executable to: apply a first timing advance (TA) when transmitting at least a first sidelink (SL) transmission to a receiver (RX) UE; and apply a second TA when transmitting at least a second SL transmission to the RX UE.

Aspect 29: A computer-readable medium for wireless communications by a receiver (RX) user equipment (UE), comprising codes executable to: obtain, from a transmitter (TX) UE, an indication, in a first sidelink (SL) transmission, of a timing advance (TA); and apply the TA when receiving at least a second SL transmission from the TX UE.

Aspect 30: An apparatus for wireless communications by a transmitter (TX) user equipment (UE), comprising: a processing system configured to apply a first timing advance (TA) when transmitting at least a first sidelink (SL) transmission to a receiver (RX) UE, and apply a second TA when transmitting at least a second SL transmission to the RX UE.

Aspect 31: An apparatus for wireless communications by a receiver (RX) user equipment (UE), comprising: an interface configured to obtain, from a transmitter (TX) UE, an indication, in a first sidelink (SL) transmission, of a timing advance (TA); and a processing system configured to apply the TA when receiving at least a second SL transmission from the TX UE.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations 600 of FIG. 6 and/or operations 700 of FIG. 7.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for applying, means for determining, means for reserving, and means for indicating may include a processing system, which may include one or more processors, such as processors 258, 264 and 266, and/or controller/processor 280 of the UE 120a and/or processors 220, 230, 238, and/or controller/processor 240 of the BS 110a shown in FIG. 2.

In some cases, rather than actually transmitting a frame a device may have an interface to output a frame for transmission (a means for outputting for transmission). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIG. 6 and/or FIG. 7 may be performed by various processors shown in FIG. 2.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 6 and/or 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communications by a transmitter (TX) user equipment (UE), comprising:
applying a first timing advance (TA) when transmitting at least a first sidelink (SL) transmission to a receiver (RX) UE, wherein the first SL transmission comprises a first transmission of a first transport block (TB); and
applying a second TA when transmitting at least a second SL transmission to the RX UE, wherein:
the second SL transmission comprises a retransmission of the first TB; and
the second TA is based on a gap duration between an end of the first SL transmission and a beginning of the second SL transmission.

2. The method of claim 1, wherein:
the first SL transmission comprises a physical sidelink control channel (PSCCH); and
the second SL transmission comprises a physical sidelink shared channel (PSSCH).

3. The method of claim 1, wherein the first and second SL transmissions are transmitted via time division multiplexing (TDM) in a same time slot.

4. The method of claim 1, wherein the gap duration is specified, pre-configured or configured by a network entity.

5. The method of claim 1, wherein the gap duration is based, at least in part, on a set of pre-determined gap durations.

6. The method of claim 1, further comprising:
reserving a future resource for transmission of the second SL transmission, wherein the second SL transmission is transmitted in the future resource with at least one of the first TA or the second TA being applied.

7. The method of claim 1, wherein:
the first TA is based on downlink (DL) timing for a transmission between a network entity and the TX UE.

8. The method of claim 7, wherein the first TA is at least one of:
a zero value; or
an offset value based on the DL timing.

9. The method of claim 1, wherein:
the second TA is based on uplink (UL) timing for a transmission between a network entity and the TX UE.

10. The method of claim 1, further comprising:
indicating, in the first SL transmission to the RX UE, the second TA.

11. The method of claim 10, wherein the indication is indicated in sidelink control information (SCI).

12. The method of claim 1, wherein the first TA is based on a pre-determined value.

13. The method of claim 12, wherein:
if SL communications between the TX UE and the RX UE share a frequency division duplex (FDD) spectrum, the pre-determined value is zero; and
if SL communications between the TX UE and the RX UE share a time division duplex (TDD) spectrum, the pre-determined value is a fixed value.

14. The method of claim 1, wherein the second TA is based on at least one of:
an uplink (UL) TA of the TX UE; or
a quantized UL TA of the TX UE.

15. The method of claim 14, further comprising:
receiving an indication of the second TA via a downlink control information (DCI) from a network entity.

16. The method of claim 15, wherein the indicated second TA is based on at least one of:
a zero value;
a pre-determined non-zero value; or
the UL TA.

17. A method of wireless communications by a receiver (RX) user equipment (UE), comprising:
obtaining, from a transmitter (TX) UE, an indication of a timing advance (TA) in a first sidelink (SL) transmission, wherein the first SL transmission comprises a first transmission of a first transport block (TB); and
applying the TA when receiving at least a second SL transmission from the TX UE, wherein:
the second SL transmission comprises a retransmission of the first TB; and
the TA is based on a gap duration between an end of the first SL transmission and a beginning of the second SL transmission.

18. The method of claim 17, wherein the first SL transmission comprises sidelink control information (SCI).

19. The method of claim 17, wherein the TA is based on at least one of:
a zero value;
a pre-determined non-zero value; or
an UL TA.

20. A user equipment (UE) configured for wireless communications, comprising:
a memory comprising processor-executable instructions; and
a processor configured to execute the processor-executable instructions and cause the UE to:
apply a first timing advance (TA) when transmitting, via at least one antenna, at least a first sidelink (SL) transmission to a receiver (RX) UE, wherein the first SL transmission comprises a first transmission of a first transport block (TB); and apply a second TA when transmitting, via the at least one antenna, at least a second SL transmission to the RX UE, wherein:

the second SL transmission comprises a retransmission of the first TB; and the second TA is based on a gap duration between an end of the first SL transmission and a beginning of the second SL transmission.

21. A user equipment (UE) configured for wireless communications, comprising:

a memory comprising processor-executable instructions; and a processor configured to execute the processor-executable instructions and cause the UE to:

receive, from a transmitter (TX) UE, an indication of a timing advance (TA), in a first sidelink (SL) transmission, wherein the first SL transmission comprises a first transmission of a first transport block (TB); and apply the TA when receiving at least a second SL transmission from the TX UE, wherein:

the second SL transmission comprises a retransmission of the first TB; and and the TA is based on a gap duration between an end of the first SL transmission and a beginning of a second SL transmission.

22. The method of claim 1, wherein the gap duration is a nominal gap duration between a control channel (CCH) transmission and a shared channel (SCH) transmission.

23. The method of claim 1, wherein the gap duration is an offset of a nominal gap duration based on a duration of the first TA.

24. The method of claim 4, wherein the gap duration is specified, pre-configured or configured based on a cell radius.

* * * * *